United States Patent
Oh et al.

(10) Patent No.: US 11,064,141 B2
(45) Date of Patent: Jul. 13, 2021

(54) IMAGING SYSTEMS AND METHODS FOR REDUCING DARK SIGNAL NON-UNIFORMITY ACROSS PIXELS

(71) Applicant: SEMICONDUCTOR COMPONENTS INDUSTRIES, LLC, Phoenix, AZ (US)

(72) Inventors: Minseok Oh, San Jose, CA (US); Tomas Geurts, Haasrode (BE); Richard Scott Johnson, Boise, ID (US); Kai Shen, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/661,083

(22) Filed: Oct. 23, 2019

(65) Prior Publication Data
US 2021/0029313 A1  Jan. 28, 2021

Related U.S. Application Data

(60) Provisional application No. 62/878,089, filed on Jul. 24, 2019.

(51) Int. Cl.
*H04N 5/361* (2011.01)
*H04N 5/365* (2011.01)
(Continued)

(52) U.S. Cl.
CPC ............ *H04N 5/361* (2013.01); *H04N 5/355* (2013.01); *H04N 5/3655* (2013.01); *H04N 5/378* (2013.01)

(58) Field of Classification Search
CPC ...... H04N 5/361; H04N 5/3655; H04N 5/378; H04N 5/355
See application file for complete search history.

(56) References Cited

U.S. PATENT DOCUMENTS

| 2004/0263648 A1* | 12/2004 | Mouli ............... H04N 5/361 348/243 |
| 2007/0003849 A1* | 1/2007 | Shirai ............ H01L 27/14643 430/57.7 |

(Continued)

FOREIGN PATENT DOCUMENTS

| DE | 3733074 A1 | 4/1989 |
| DE | 102016218838 A1 | 4/2017 |

(Continued)

OTHER PUBLICATIONS

EMVA Standard 1288, "Standard for Characterization of Image Sensors and Cameras," European Machine Vision Association, Nov. 29, 2010, Release 3.0, pp. 1-36.

*Primary Examiner* — Ahmed A Berhan
(74) *Attorney, Agent, or Firm* — Treyz Law Group, P.C.; Tianyi He

(57) ABSTRACT

An image sensor may include an array of image pixels. Control circuitry coupled to the array of pixels may be configured to operate the image pixels in an overflow mode of operation, in which each pixel generates an overflow image signal and a complete image signal from a single exposure time period. The overflow image signals and the complete image signals from the pixels may be used to generate a high dynamic range image. While the floating diffusion region in each pixel is not in use, control circuitry may control that pixel to generate a reference signal at the floating diffusion region indicative of pixel-specific dark signal noise. Processing circuitry may mitigate for dark signal non-uniformity across the pixels by correcting the complete image signals using the reference signal to remove dark signal noise in the complete image signals.

19 Claims, 6 Drawing Sheets

(51) Int. Cl.
*H04N 5/355* (2011.01)
*H04N 5/378* (2011.01)

(56) References Cited

U.S. PATENT DOCUMENTS

| | | |
|---|---|---|
| 2009/0045319 A1 | 2/2009 | Sugawa et al. |
| 2014/0084143 A1 | 3/2014 | Sakano et al. |
| 2015/0189199 A1 | 7/2015 | Borremans et al. |
| 2015/0198199 A1* | 7/2015 | Wu .......................... A63H 3/46 403/119 |

FOREIGN PATENT DOCUMENTS

| | | |
|---|---|---|
| DE | 102016218843 A1 | 4/2017 |
| EP | 1887626 | 2/2008 |
| EP | 3078189 B1 | 11/2017 |

\* cited by examiner

IMAGING SYSTEMS AND METHODS FOR REDUCING DARK SIGNAL NON-UNIFORMITY ACROSS PIXELS

CROSS-REFERENCE TO RELATED APPLICATIONS

This application claims the benefit of U.S. Provisional Patent Application No. 62/878,089, filed on Jul. 24, 2019, the entire contents of which is incorporated herein by reference.

BACKGROUND

This relates generally to imaging devices, and more particularly, to imaging devices for reducing dark signal noise.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

Typically, each image pixel contains a photodiode for generating charge in response to incident light. Each Image pixel also includes a charge storage region for storing charge that is generated by the photodiode.

However, in some operating environments, the charge storage region exhibits significant dark signal noise that is non-uniform across different pixels. Dark signal non-uniformity across the charge storage regions in corresponding pixels degrades image quality. As an example, this undesirable pixel-specific noise is particularly apparent at high temperatures, which impedes image sensor operation for certain high-temperature applications.

It would therefore be desirable to provide imaging systems with reduced dark signal non-uniformity across pixels.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
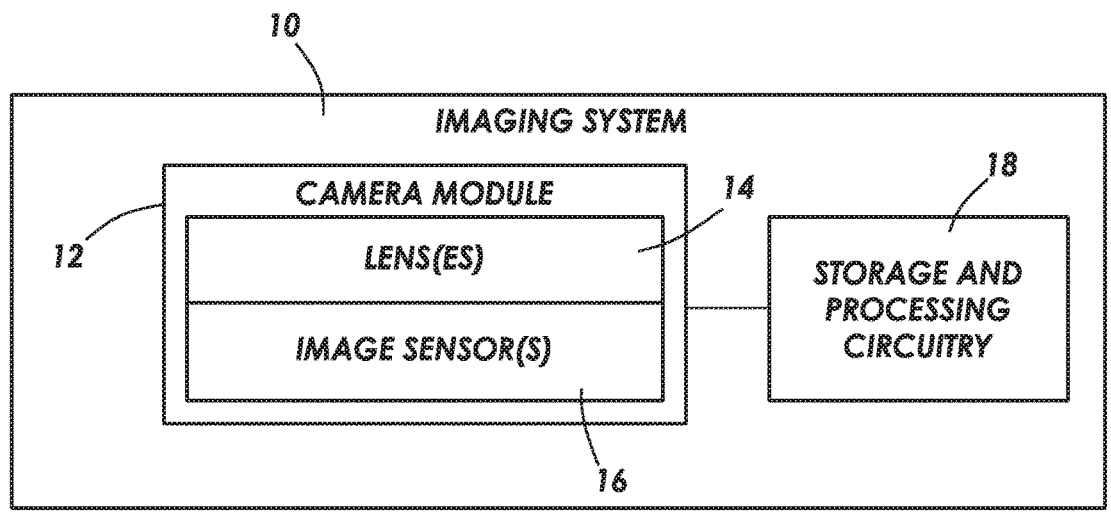
FIG. 1 is a diagram of an illustrative electronic device having an image sensor and processing circuitry for capturing images using an array of image pixels in accordance with some embodiments.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 (sometimes referred to as an imaging module) may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16 and other macro lenses. During image capture operations, light from a scene may be focused onto image sensor 16 by lenses 14. Image sensor 16 may include circuitry for converting analog pixel image signals into corresponding digital image data that is provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from the camera module and/or that form part of the camera module (e.g., circuits that form part of an integrated circuit that includes image sensors 16 or an integrated circuit within the module that is associated with image sensors 16). When storage and processing circuitry 18 is included on different integrated circuits (e.g., chips) than those of image sensors 16, the integrated circuits with circuitry 18 may be vertically stacked or packaged with respect to the integrated circuits with image sensors 16. Image data that has been captured by the camera module may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, an external display, or other devices) using wired and/or wireless communications paths coupled to processing circuitry 18.

Figure 2:
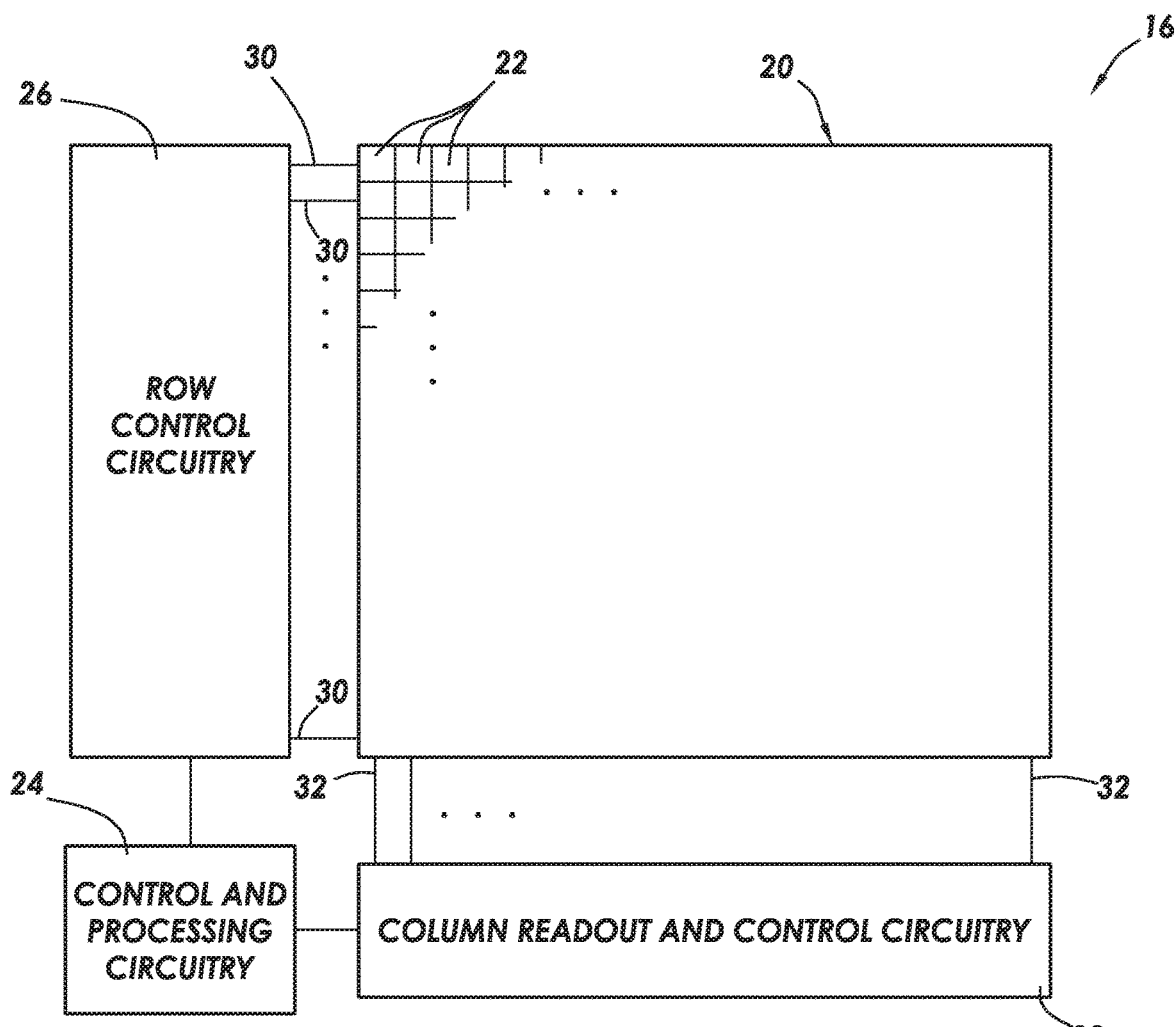
FIG. 2 is a diagram of an illustrative pixel array and associated readout circuitry for reading out image signals from the pixel array in accordance with some embodiments.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, anti-blooming, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry or a multiplier circuit, analog to digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) for pixels in one or more pixel columns.

If desired, image pixels 22 may each include more than one photosensitive region for generating charge in response to image light. Photosensitive regions within image pixels 22 may be arranged in rows and columns on array 20. Pixel array 20 may also be provided with a filter array having multiple (color) filter elements (each corresponding to a respective pixel) which allows a single image sensor to sample light of different colors or sets of wavelengths. As an example, image sensor pixels such as the image pixels in array 20 may be provided with a color filter array having red, green, and blue filter elements, which allows a single image sensor to sample red, green, and blue (RGB) light using corresponding red, green, and blue image sensor pixels arranged in a Bayer mosaic pattern.

In another suitable example, the green pixels in a Bayer pattern may be replaced by broadband image pixels having broadband color filter elements (e.g., clear color filter elements, yellow color filter elements, etc.). In yet another example, one of the green pixels in a Bayer pattern may be replaced by infrared (IR) image pixels formed under IR color filter elements and/or the remaining red, green, and blue image pixels may also be sensitive to IR light (e.g., may be formed under filter elements that pass IR light in addition to light of their respective colors). These examples are merely illustrative and, in general, filter elements of any desired color and/or wavelength and in any desired pattern may be formed over any desired number of image pixels 22.

Image sensor 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices technology. Image pixels 22 may be frontside illumination (FSI) image pixels or backside illumination (BSI) image pixels. If desired, image sensor 16 may include an integrated circuit package or other structure in which multiple integrated circuit substrate layers or chips are vertically stacked with respect to each other. In this scenario, one or more of circuitry 24, 26, and 28 may be vertically stacked above or below array 20 within image sensor 16. If desired, lines 32 and 30 may be formed from vertical conductive via structures (e.g., through-silicon vias or TSVs) and/or horizontal interconnect lines in this scenario.

Figure 3:
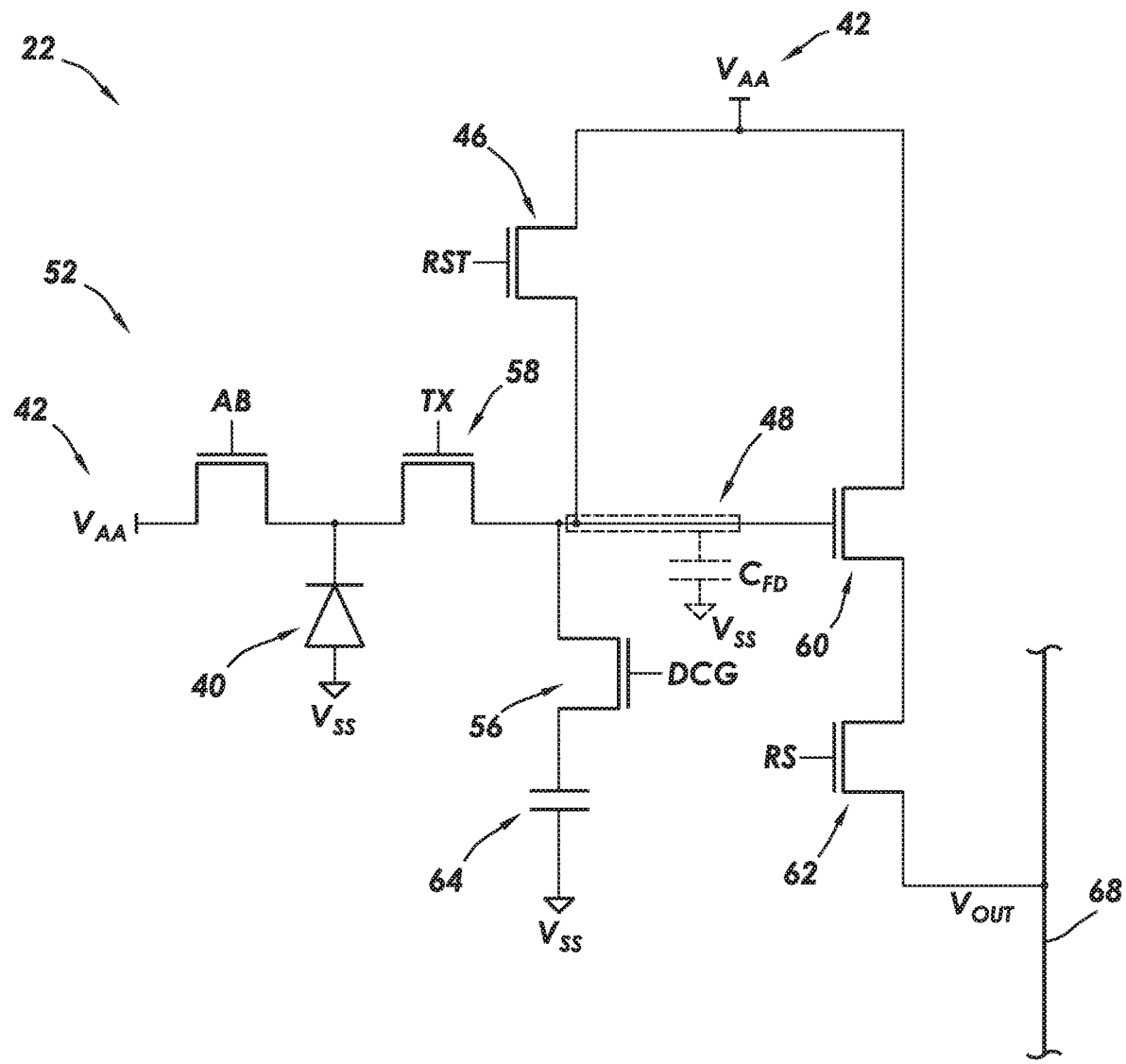
FIG. 3 is a circuit diagram of an illustrative image pixel operable to reduce dark signal noise in accordance with some embodiments.

FIG. 3 is a circuit diagram of an illustrative image pixel 22. As shown in FIG. 3, pixel 22 may include a photosensitive element such as photodiode 40. A positive power supply voltage $V_{AA}$ may be supplied at positive power supply terminals 42. Incoming light may be collected by photodiode 40. Photodiode 40 may generate charge (e.g., electrons) in response to receiving impinging photons. The amount of charge that is collected by photodiode 40 depends on the intensity of the impinging light and the exposure duration (or integration time).

Before an image is acquired, reset transistor 46 may be turned on to reset charge storage region 48 (sometimes referred to as a floating diffusion region) to voltage $V_{AA}$. The voltage levels stored at floating diffusion region 48 may be read out using charge readout circuitry. The charge readout circuitry may include source follower transistor 60 and row select transistor 62. The signal stored at charge storage region 48 may include image level signals, reset level signals, and/or other reference level signals.

Pixel 22 may include anti-blooming transistor 52 (sometimes referred to as a photodiode reset transistor or a reset transistor). When transistor 52 is turned on, photodiode 40 may be reset to power supply voltage $V_{AA}$ (e.g., by connecting power supply terminal 42 to photodiode 40 through reset transistor 52). When transistor 52 is turned off, photodiode 40 may begin to accumulate photo-generated charge.

Pixel 22 may include transfer transistor 58. Transfer transistor 58 may be turned on to transfer charge from photodiode 40 to floating diffusion region 48. Floating diffusion region 48 may be a doped semiconductor region (e.g., a region in a silicon substrate that is doped by ion implantation, impurity diffusion, or other doping process). Floating diffusion region 48 may have an associated charge storage capacity (e.g., as shown by capacitance $C_{FD}$ of a capacitor coupled to a grounding terminal $V_{SS}$ in FIG. 3).

Row select transistor 62 may have a gate terminal that is controlled by a row select signal (i.e., signal RS). When the row select signal is asserted, transistor 62 is turned on and a corresponding signal $V_{OUT}$ (e.g. an output signal having a magnitude that is proportional to the amount of charge at floating diffusion region 48), is passed onto a pixel output path and column line 68 (i.e., line 32 in FIG. 2).

In a typical image pixel array configuration, there are numerous rows and columns of pixels 22. A column readout path may be associated with each column of pixels 22 (e.g., each image pixel 22 in a column may be coupled to the column readout path through an associated row select transistor 62). Control signal RS may be asserted to read out signal $V_{OUT}$ from a selected image pixel onto the pixel readout path. Image signal $V_{OUT}$ may be provided to readout circuitry 28 and processing circuitry 18 for further processing.

Pixel 22 may also include dual conversion gain transistor 56 and charge storage structure 64 (e.g., capacitor 64). Transistor 56 may couple charge storage structure 64 to floating diffusion region 48. Capacitor 64 may be coupled between transistor 56 and a grounding structure providing a grounding voltage $V_{SS}$. In other words, capacitor 64 may have a first terminal coupled to a voltage source supplying grounding voltage $V_{SS}$ and a second terminal coupled to transistor 56. Alternatively, capacitor 64 may be coupled to a positive power supply terminal 42 such as a positive voltage supply rail, in place of the ground structure, if desired. As such, capacitor 64 may extend the storage capacity of floating diffusion region 48 in storing image charge (e.g., by activating transistor 56, when charge stored at floating diffusion region 48 is above a potential barrier and overflows to capacitor 64, etc.). In other words, the second terminal of capacitor 64 coupled to transistor 56 may help hold charge.

If desired, charge storage structure 64 may be implemented as other charge storage structures (e.g., a storage diode, a storage node, a storage gate, a storage charge structure having a storage region formed in a similar manner as floating diffusion region 48, etc.). If desired, charge storage structure 64 may have storage capacity that is larger than that of floating diffusion region (e.g., that is two times larger, three times larger, five times larger, ten times larger, etc.).

If care is not taken, pixels 22 in array 20 may exhibit pixel-specific dark signal noise (sometimes referred to as dark current noise), for example, at floating diffusion region 48 (or at any other charge storage region). In particular, this undesirable effect is particularly undesirable when transitioning from one pixel response slope to another (e.g., in capturing different types of signals to construct high dynamic range images, in capturing low gain and high gain signals in an overflow mode of operation, etc.) and in high temperature environments.

To mitigate these issues, control circuitry such as row control circuitry 26, column control circuitry 28, and/or control and processing circuitry 24 in FIG. 2 may operate pixels 22 to generate a reference charge storage region signal in addition to reset level signals and image level signals. The reference charge storage region signal generated for a particular charge storage region in a corresponding pixel may be indicative of the pixel-specific dark signal noise for the particular charge storage region in the corresponding pixel.

As an example, pixel 22 may be operable in an overflow mode of operation in which, transistor 58 may be configured to transfer an overflow charge to floating diffusion region 48 to generate a first image signal and to transfer a remaining charge to floating diffusion region 48 to generate a second image signal. The second image signal, as an example, may be susceptible to degradation. As such, a reference signal may be generated using floating diffusion region 48 to correct the second image signal and mitigate the degradation. Further details for generating the reference signal and processing image signals based on the reference signal is described herein.

Figure 4:
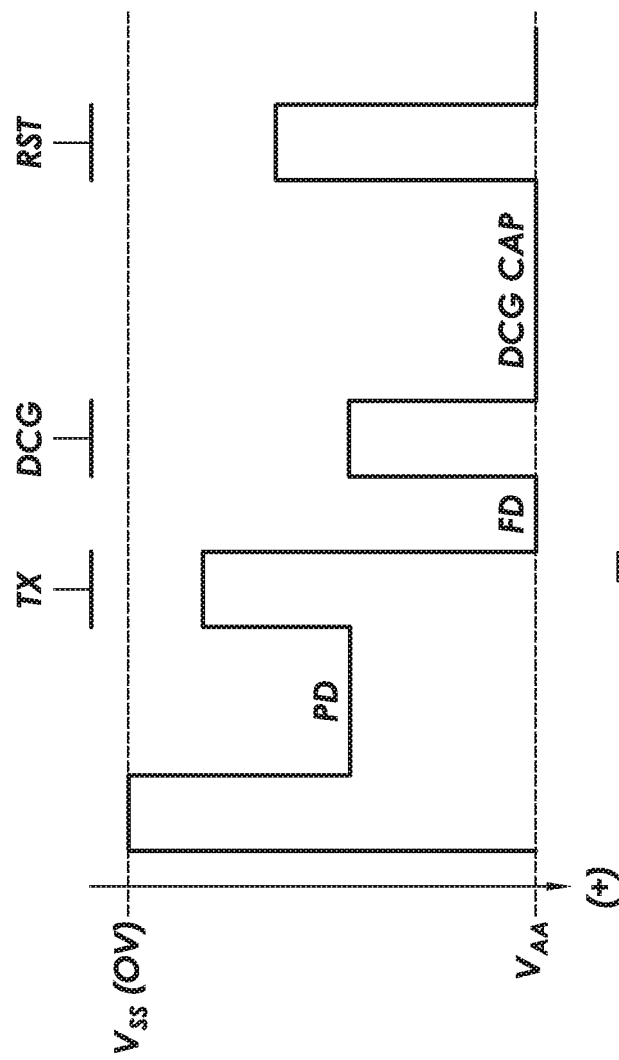
FIG. 4 is an illustrative potential diagram for an image pixel such as the illustrative image pixel shown in FIG. 3 in accordance with some embodiments.

FIG. 4 shows an illustrative potential diagram for some structures in an image pixel of the type shown in FIG. 3. In particular, FIG. 4 shows well PD representing photodiode 40, well FD representing floating diffusion region 48, and well DCGCAP representing capacitor 64. Transistor 58 may be represented by a potential barrier interposed between well PD and well FD modulated by control signal TX. Transistor 56 may be represented by a potential barrier interposed between well FD and well DCGCAP modulated by control signal DCG. While reset transistor 46 may be represented by the potential barrier adjacent to well DCGCAP modulated by control circuit RST, the actual placement of the reset transistor may be implemented as being adjacent to well FD (as indicated in FIG. 3).

As shown in FIG. 4, in a particular configuration, the potential barrier associated with transistor 58 may be a partial potential barrier that allows some charge accumulated in well PD to overflow to well FD without fully asserting control signal TX to fully lower the potential barrier (e.g., to be the same as the potential of well PD). Control circuitry may also fully assert control signal TX to lower the potential barrier to transfer all of the charge accumulated in well PD to well FD or fully deassert control signal TX to raise the potential barrier (e.g., to level $V_{SS}$) to isolate well PD from well FD. To accommodate for all of the charge transferred from well PD, the potential barrier associated with transistor 56 between well FD and well DCGCAP may be lowered to extend the storage capacity of well FD. FIG. 4 shows a lowered potential barrier between well FD and well DCGCAP. Control circuitry may similarly deassert control signal DCG to raise the potential barrier (e.g., to level $V_{SS}$) to isolate well FD from well DCGCAP.

Figure 5:
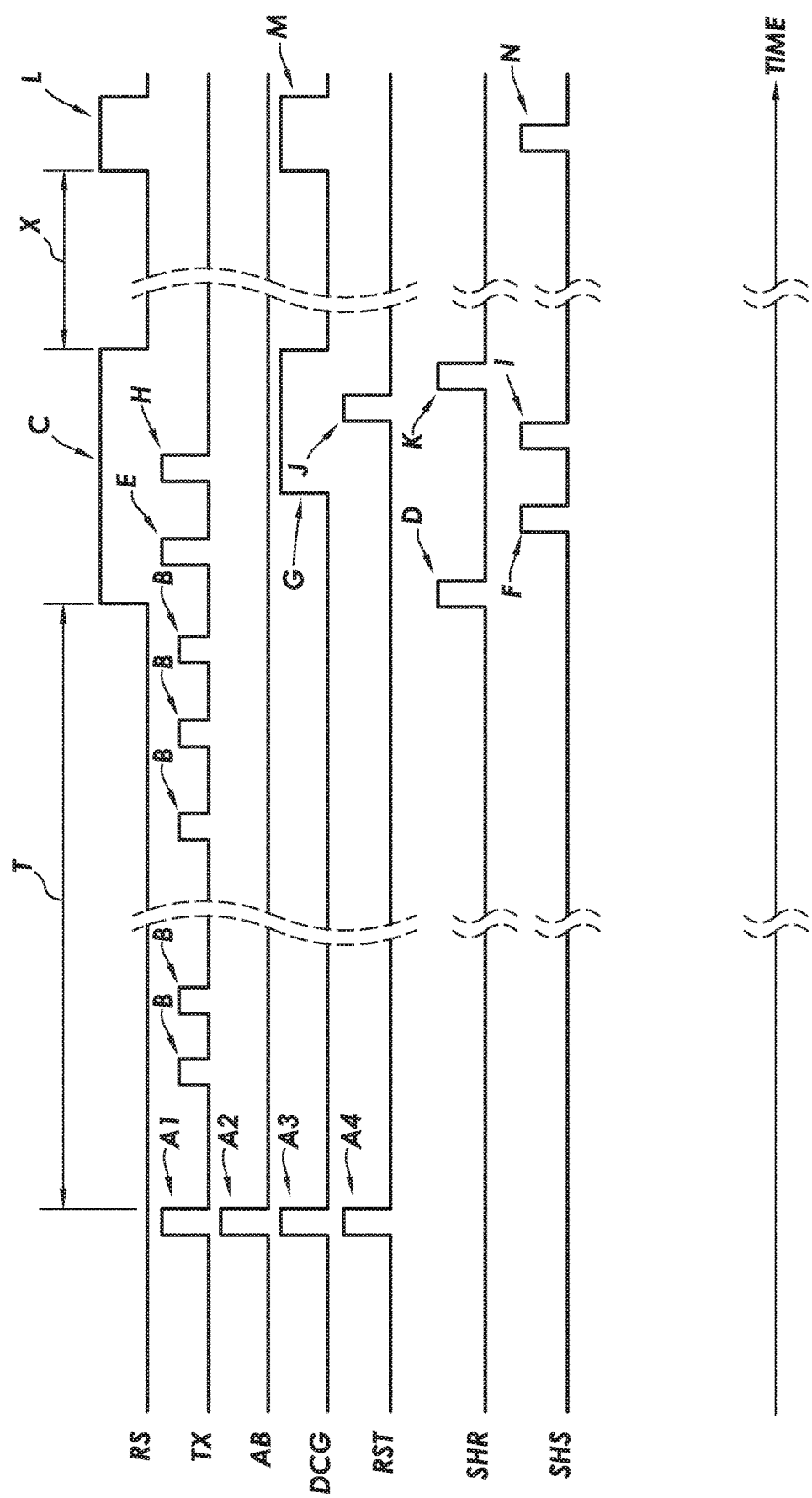
FIG. 5 is a timing diagram for operating an image pixel such as the illustrative image pixel shown in FIG. 3 to generate a reference signal for reducing dark signal noise in accordance with some embodiments.

FIG. 5 shows an illustrative timing diagram for generating image level signals, reset level signals, and a reference level signal using an image pixel of the type shown in FIG. 3. As shown in FIG. 5, control signals TX, AB, DCG, and RST, respectively controlling transistors 58, 52, 56, and 46 (in FIG. 3) may all be asserted to reset the operation of pixel 22 (i.e., using assertions A1, A2, A3, A4). The falling edge of assertions A1, A2, A3, and A4 may begin an integration time such as integration time period T for photodiode 40. Integration time period T may last any desirable amount of time. The duration of integration time period T shown in FIG. 5 is merely illustrative. The actual integration time period T may begin at the falling edge of a photodiode reset and end at the falling edge of a last charge transfer from the photodiode (i.e., a last TX assertion associated with integration time period T, the last TX assertion B for a low light signal, assertion E for another low light signal, assertion H for a high light signal, etc.).

Throughout integration time T, control signal TX may be partially asserted (i.e., assertion B) to transfer respective overflow portions of charge from photodiode 40 to floating diffusion region 48 and generate an overflow charge at floating diffusion region 48. In other words, control signal TX may be periodically asserted partially to provide the partial potential barrier for transistor 58 shown in FIG. 4 between well PD and well FD. If desired, control signal TX may be continuously held at the partial potential barrier level during integration time T instead of being periodically pulsed. To enable readout of signals from pixel 22, control signal RS may be asserted (i.e., assertion C) to activate transistor 62 (in FIG. 3). Transistor 62 may remain activated for the entire duration of the readout operations associated with integration time period T. After a desirable number of partial TX assertions B and/or after a desirable period of time, readout circuitry 28 may read out the signal stored at floating diffusion region 48.

In some dark or low to mid-level light environments, where no overflow portions of charge are stored in floating diffusion region, this signal stored at floating diffusion region 48 may be a dark current level signal or a reset level signal. In other words, when the amount of charge accumulated at photodiode 40 is never above the partial potential barrier set by a partially asserted TX signal, no overflow charge is transferred using assertion B. In some mid to high-level light environments, this signal stored at floating diffusion region 48 may be an overflow charge portion transferred using assertions B. The readout and storage of this signal stored at floating diffusion region 48 may correspond to the assertion of control signal SHR (i.e., assertion D) indicative of sampling and storing the reset or overflow level signal.

After performing the readout operations for the reset or overflow level signal, control signal TX may be (fully)

asserted (i.e., assertion E). Transistor 58 is therefore configured to transfer a remaining charge (e.g., a remaining portion of the total charge accumulated at photodiode 40 during integrated time period T after the overflow portion has been transferred) from photodiode 40 to floating diffusion region 48. Readout circuitry may subsequently read out the total image signal stored at floating diffusion region 48 (e.g., any overflow portion of charge transferred using assertions B and any remaining portion of charge transferred using assertion E, or the total charge using assertion E when there is no overflow portion of charge). This may correspond to the assertion of control signal SHS (i.e., assertion F) indicative of sampling and storing the cumulative image level signal. The readout sequence with the reset level signal (assertion D) and the cumulative image level signal (assertion F) may be a correlated double sampling readout.

After performing the readout operations for the cumulative overflow and remaining portions of image level signal, pixel 22 may be configured to read out all of the charge accumulated at photodiode 40 during integration time period T as a complete image signal. In particular, control signal DCG may be asserted (i.e., assertion G) to connect floating diffusion region 48 to capacitor 64. While control signal DCG is asserted, control signal TX may be (fully) asserted to transfer all of the charge accumulated photodiode 40 during integration time period T to floating diffusion region 48 and capacitor 64. Readout circuitry may subsequently read out a complete image level signal from floating diffusion region 48 and capacitor 64 (while control signal DCG remains asserted). This may correspond to the assertion of control signal SHS (i.e., assertion I) indicative of sampling and storing the complete image level signal.

After performing the readout operations for the complete image level signal, pixel 22, control signal RST may be asserted (i.e., assertion J) to reset floating diffusion region 48 and capacitor 64 to a reset level voltage. This reset level voltage may also be read out using readout circuitry. This may correspond to the assertion of control signal SHR (i.e., assertion K) indicative of sampling and storing this second reset level signal. The readout sequence with the complete image level signal and the second reset level signal may be a double sampling readout.

By operating pixels 22 in an overflow mode of operation as exemplified by the timing diagram shown in FIG. 5, a single-exposure high dynamic range image may be generated. As an example, both a high gain signal and a low gain signal may be generated by each pixel based on only a single exposure period such as integration time period T in FIG. 5. The high dynamic range image may be generated based on the high and low gain signals generated by each pixel. In particular, in dark or low to mid-level light environments the signals from SHR assertion D and SHS assertion F may be used. In mid to high-level light environments, the signals from SHS assertion I and SHR assertion K may be used.

The high and low gain signal are associated with different light exposure responses of the pixel. As such, variations in dark signal at floating diffusion regions (or other storage regions) across pixels cause spatial variation in the response of the pixels. This may lead to reduced signal-to-noise ratio (SNR) when transitioning between different light exposure responses (e.g., from a high gain response to a low gain response).

To mitigate this reduction in SNR, control circuitry such as row control circuitry 26, column control circuitry 28, control and processing circuitry 24 (in FIG. 2), and/or processing circuitry 18 (in FIG. 1), may operate pixel 22 to generate a reference signal that is indicative of a dark signal (sometimes referred to as dark current) at floating diffusion region 48. Still referring to FIG. 5, assertion J of control signal RST may reset floating diffusion region 48 and capacitor 64 to a reset level voltage. The falling edge of assertion J may begin a reference signal generation time period such as time period X. While the duration of time period X is shown to be aligned with the falling edge of assertion C, this is merely illustrative. The reference signal generation time period may begin as soon as floating diffusion region 48 and/or capacitor 64 are reset to the reset voltage level. Time period X may end when the reference signal is read out. Time period X may span any desirable duration of time. As an example, pixels 22 in array 20 may operate in a rolling shutter mode, and time period X may be determined based on a horizontal blank time such that the reference signal readout operations (assertions L, M, and N) fit into the horizontal blank time of another row (e.g., a different row than that of a given pixel 22).

At the end of reference signal generation time period X, control signal RS may be asserted (i.e., assertion L) and control signal DCG may be asserted (i.e., assertion M). Readout circuitry may read out the reference signal (sometimes referred to herein as a charge storage region signal, a reference charge storage region signal, a floating diffusion signal, a reference floating diffusion signal, a pixel-specific dark current signal, or a dark current signal) from floating diffusion region 28 and capacitor 64. This may correspond to the assertion of control signal SHS (i.e., assertion N) indicative of sampling and storing the reference signal. The readout sequence with the second reset level signal (associated with assertion K) and the reference level signal may be a correlated double sampling readout.

Processing circuitry such as processing circuitry 24 and/or processing circuitry 18 may be configured to use the reference signal to compensate for dark signal noise in one or more image level signals generated by that pixel 22. As an example, the complete image level signal may be processed based on the reference signal. In particular, because the amount of dark signal noise generated is proportional to the integration time, the complete image level signal may be subtracted by the reference signal adjusted proportionally by the ratio of integration time period T to time period X. In other words, a corrected complete image level signal may be equal to the complete image level signal subtracted by the reference signal multiplied by the ratio of the duration of time period T to the duration of time period X.

Put another way, the reference signal multiplied by the ratio of the duration of period T to the duration of period X serves as an estimate to the amount of dark signal noise generated during period T, and hence the amount of dark signal noise in the complete image level signal. If desired, the complete image level signal may be corrected in other manners as suitable based on the reference signal. If desired, this correction based on the reference signal may be applied to other signals generated by pixel 22.

Figure 6:
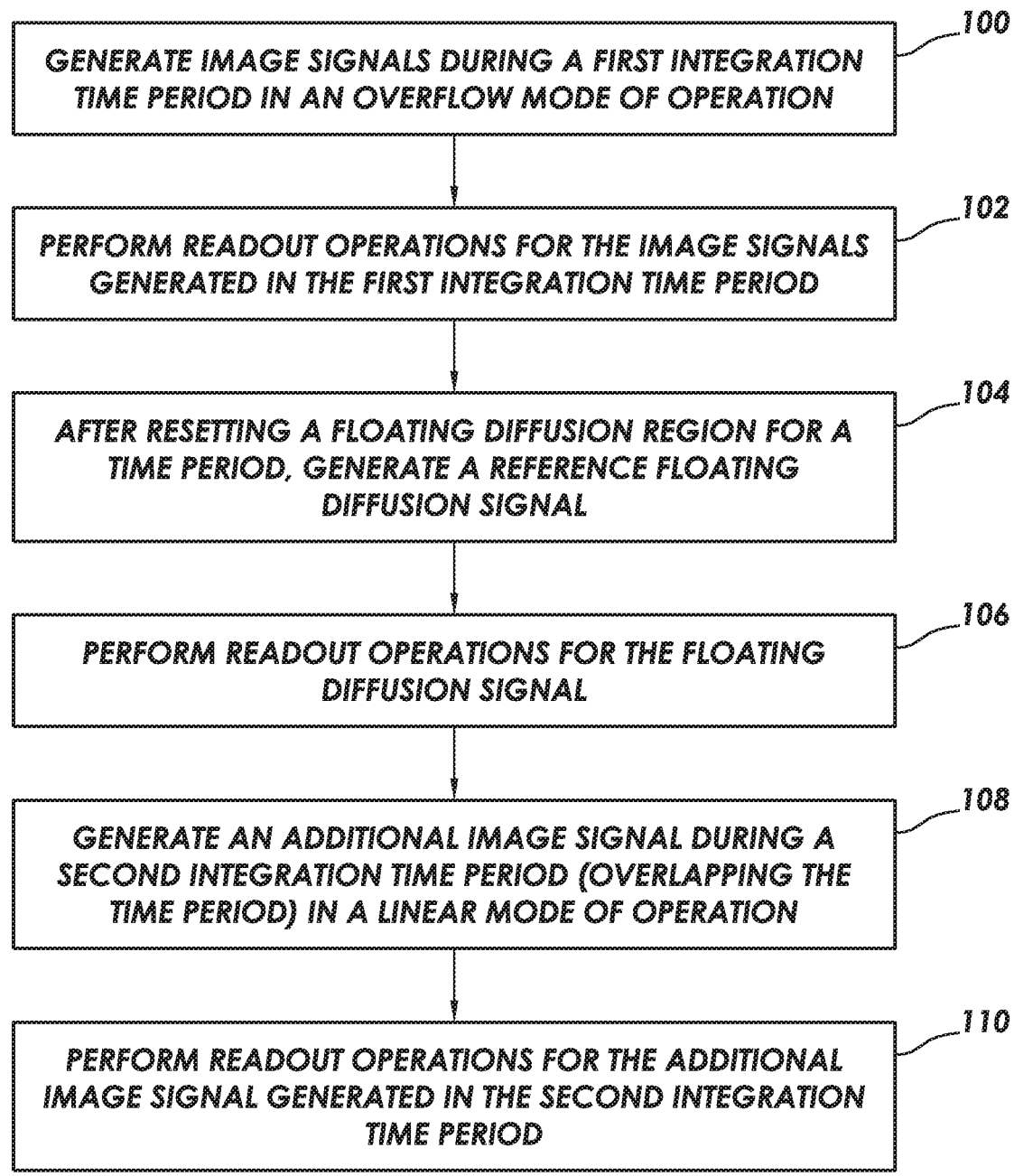
FIG. 6 is a flowchart of illustrative steps for generating a reference signal for reducing dark signal noise between separate integration periods in accordance with some embodiments.

The timing diagram shown in FIG. 5 and the pixel configuration shown in FIG. 3 are merely illustrative. If desired, any suitable pixel operated in any suitable manner may be used to generate a reference signal that is useable to reduce pixel signal noise (e.g., noise across different pixels associated with dark signal non-uniformity). As an example, FIG. 6 shows an illustrative flowchart for generating a reference signal in combination with generating other image signals in multiple exposure periods.

At step 100, control circuitry (e.g., row control circuitry 26, column control circuitry 28, control and processing circuitry 24 in FIG. 2, and/or processing circuitry 18 in FIG.

1) may control a given pixel to generate one or more signals during a first integration time period in an overflow mode of operation. As an example, one or more image level signals may be generated from a single integration time period. This may be similar to the generation of an overflow image level signal, a cumulative image level signal, and a complete image level signal in connection time period T in FIG. 5.

At step 102, control circuitry may control the given pixel and corresponding readout circuitry to perform readout operations for the image signals generated in the integration time period. As an example, the control circuitry may control transistors and the readout circuitry to perform the readout operations for an overflow image level signal, a cumulative image level signal, a complete image level signal, or any other suitable image signals generated in connection with the first integration time period. This may be similar to the readout of the overflow image level signal and the complete image level signal in FIG. 5.

At step 104, control circuitry may control one or more transistors to reset a floating diffusion region for a time period, thereby generating a reference floating diffusion signal for the time period. As an example, during this time period, the floating diffusion region may not be used for readout operations but rather to detect and gather a dark current noise signal as the reference floating diffusion region signal. This may be similar to the generation of the reference signal after assertion J (e.g., during time period X) in FIG. 5.

At step 106, control circuitry may control the given pixel and corresponding readout circuitry to perform readout operations for the reference floating diffusion signal. This may be similar to the readout operations of the reference signal in FIG. 5. The reference floating diffusion signal may be indicative of dark signal and may be used to correct for dark signal noise in other image level signals (e.g., in a complete image level signal generated at step 100 and read out at step 102).

Additionally, at step 108, control circuitry may control the given pixel to generate an additional image signal during a second integration time period in a linear mode of operation. The given pixel may be operable in the linear mode of operation by transferring all charge from a photodiode in a single transfer step to the floating diffusion region without any partial transfer as in the overflow mode of operation. Because the charge generation of the additional image signal does not require the use of the floating diffusion region, the generation and read out of the reference floating diffusion signal in steps 104 and 106 may occur simultaneously with the generation of the additional image signal at step 108. In other words, the time period for generating and/or reading out the reference floating diffusion signal in steps 104 and 106 may temporally fully overlap, partially overlap, be partially overlapped by, or be fully overlapped by the time period for generating the additional image signal.

At step 110, control circuitry may control the given pixel and the corresponding readout circuitry to perform readout operations for the additional image signal generated in the second integration time period.

If desired, the reference floating diffusion signal may be used to correct for dark current noise, potential parasitic light noise, and other undesirable interference to and between the overflow level image signal, the cumulative image level signal, the complete image level signal, the additional image signal, and any other signals. If desired, the reference floating diffusion signal may be used based on a threshold for one or more image signals. As an example, if an overflow image signal is above a certain threshold level, the reference floating diffusion signal may remain unused in processing. As another example, if an overflow image signal is below a certain threshold level, the reference floating diffusion signal may be used to correct for noise in processing.

If desired, the first image level signal and the second image signal generated during the first integration time period may each be accompanied by a reset level signal (as described in connection with FIG. 5). If desired, the additional image signal generated during the second integration time period may also be accompanied by a reset level signal. In particular, the reset level signal may be generated and read out prior to the readout of the additional image signal, thereby providing a correlated double sampling scheme.

In some embodiments, it may be desirable to use the readout operations for the reference floating diffusion signal as part of the correlated double sampling readout of the additional image signal. In other words, the dedicated reset level signal associated with the additional image signal may be omitted and replaced with the readout for the reference floating diffusion signal. Put another way, after resetting the floating diffusion for generating the reference signal and subsequently reading out the reference signal, control circuitry may perform readout operations for additional image signal without any additional floating diffusion reset.

The example of FIG. 6 shows how the generation of the reference signal may also apply to operations involving multiple exposure periods (e.g., a first exposure period corresponding to a first mode of operation and a second exposure period corresponding to a second mode of operation). The examples of FIGS. 5 and 6 are merely illustrative. If desired, the generation of the reference signal may occur at any suitable time period during the operation of pixel 22. As a particular example, the generation of the reference signal may occur during any period of time during which the floating diffusion region is not in use (e.g., is not used for image signal storage, is not used for readout operations, etc.).

Figure 7:
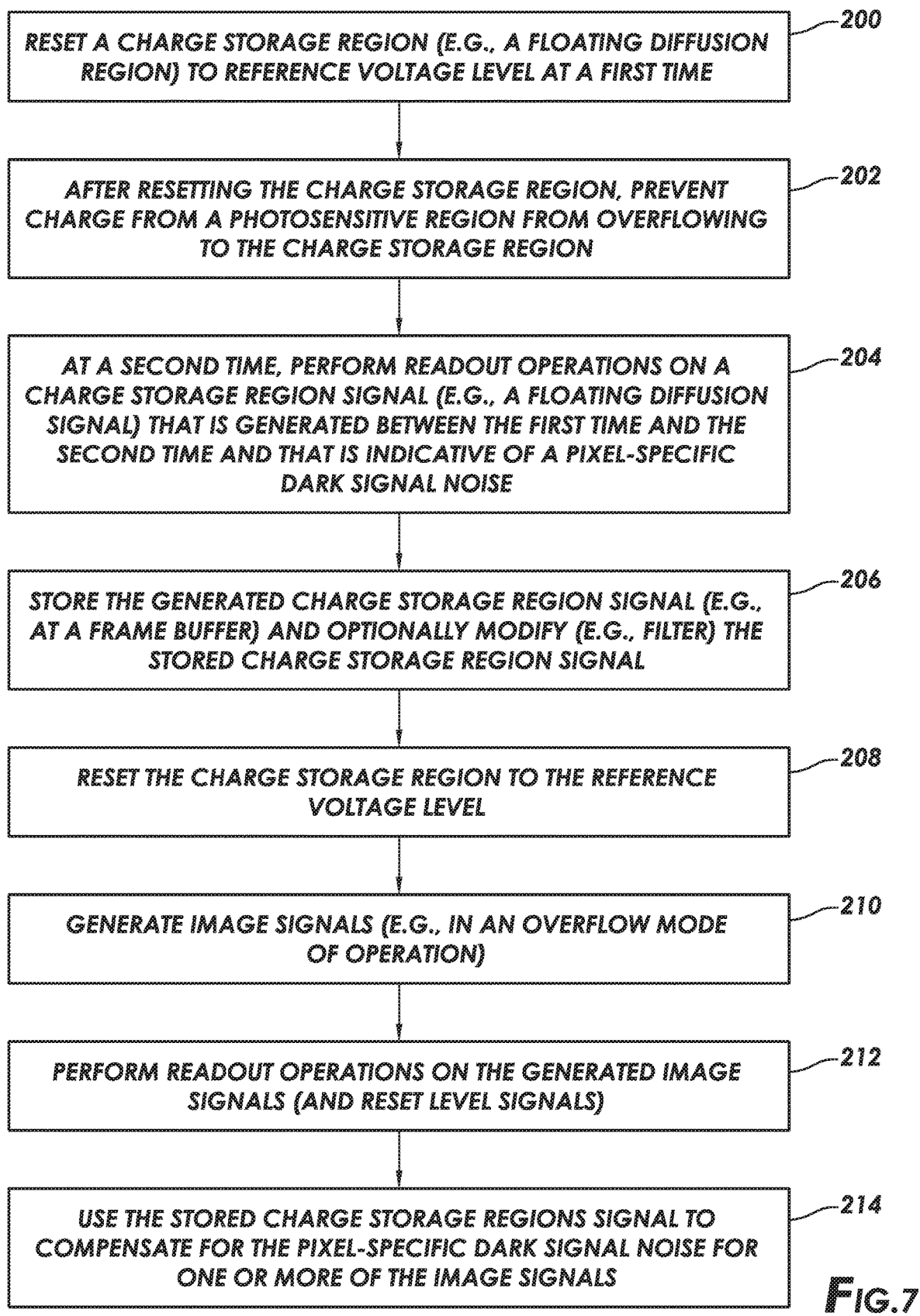
FIG. 7 is a flowchart of illustrative steps for generating a reference signal for storage in a frame buffer in accordance with some embodiments.

FIG. 7 shows an illustrative flowchart for generating a reference charge storage region signal (e.g., a floating diffusion signal or a reference signal as described above) prior to generating image signals for an overflow mode of operation.

At step 200, control circuitry (e.g., row control circuitry 26, column control circuitry 28, control and processing circuitry 24 in FIG. 2, and/or processing circuitry 18 in FIG. 1) may control a transistor in a given pixel to reset a charge storage region (e.g., a floating diffusion region) in the given pixel to a reference voltage (e.g. voltage $V_{AA}$) at a first time.

At step 202, after resetting the charge storage region, control circuitry may prevent charge from a photosensitive region from overflowing to the charge storage region. As an example, the control circuitry may completely deassert or completely raise the potential barrier for one or more transistors interposed between the photosensitive region and the charge storage region (e.g., isolate the charge storage region from the photosensitive region). In particular, in the example of FIG. 3, control circuitry may fully deassert control signal TX to fully deactivate transistor 58 (e.g., raise the potential barrier of transistor 58 to a level even larger than that shown in FIG. 4).

At step 204, control circuitry may control the given pixel and corresponding readout circuitry, at a second time, to perform readout operations on a charge storage region signal (e.g., a floating diffusion signal or a reference signal). The charge storage region signal may be generated between the first and second times and may be indicative of a pixel-specific dark signal noise.

At step 206, control circuitry may control readout circuitry to store the generated charge storage region signal at storage circuitry (e.g., a frame buffer). The control circuitry may optionally control processing circuitry to modify (e.g., filter) the stored charge storage region signal to prepare the charge storage region signal for correcting dark signal noise in other image signals generated by the given pixel.

At step 208, control circuitry may control one or more transistors to reset the charge storage region to prepare for generation of image signals using the given pixel.

At step 210, control circuitry may control the given pixel to generate one or more image signals using a photosensitive element. For example, the charge accumulated by the photosensitive element may be used in an overflow mode of operation to generate multiple image signals for HDR operations.

At step 212, control circuitry may control the given pixel and the corresponding readout circuitry to perform readout operations on the generated images. The control circuitry may also control the given pixel and the corresponding readout circuitry to perform readout operations on one or more reset voltage level signals.

At step 214, control circuitry may control processing circuitry to use the stored (or modified) charge storage region signal to compensate for the pixel-specific dark signal noise for one or more of the generated image signals. Processing circuitry may be configured to subtract the stored or a modified version of the stored charge storage region signal from one or more of the image signals to generate corresponding one or more corrected version of the image signals.

The description in FIGS. 3-7 may be applied to every pixel 22 in a pixel array 20 to remove a pixel-specific dark signal noise from one or more image signal generated in each pixel. By generating a reference signal in each pixel that can correct for the pixel-specific dark signal, the issues of dark signal non-uniformity can be mitigated and image quality can be improved.

Various embodiments have been described illustrating systems and methods for generating image signals having reduced pixel-specific dark signal.

As an example, an imaging system may include an image pixel in an array of image pixels. The image pixel may include a photosensitive element, a charge storage region, and a transfer transistor interposed between the photosensitive element and the charge storage region. Control circuitry may be coupled to the array of image pixels and may be operable to control the image pixel to generate an image signal in an overflow mode of operation and to control the image pixel to generate a reference signal at the charge storage region. Processing circuitry may be operable to correct for a dark signal noise in the image signal based on the reference signal. The control circuitry may be operable to control the image pixel to generate an additional image signal in the overflow mode of operation. The image signal and the additional image signal may be generated based on a single integration time period. The control circuitry may be operable to control readout circuitry to perform readout operations for the additional image signal prior to readout operations for the image signal. The processing circuitry may be operable to generate a high dynamic range image based on the additional image signal and the image signal. The processing circuitry may be operable to correct for the dark signal noise based on a comparison of the additional image signal with a threshold level.

If desired, the image signal may be generated during a first time period, the reference signal may be generated during a second time period, and the processing circuitry may be operable to correct for the dark signal noise based on a ratio between a duration of the first time period and a duration of the second time period. The processing circuitry may be operable to correct for the dark signal noise by multiplying the reference signal by the ratio and subtracting the ratio-multiplied reference signal from the image signal.

If desired, the reference signal may be generated before the image signal is generated, and the reference signal may be stored at a frame buffer.

If desired, the reference signal may be generated after the image signal is generated. Readout circuitry may be operable to perform readout operations for the image signal and for a reset level signal after readout operations for the image signal. The readout circuitry may be operable to perform readout operations for the reference signal, and the readout operations for the reset level signal and the reference signal may form a correlated double sampling readout. The readout circuitry may be operable to perform readout operations for an additional reset level signal and an additional image signal before the readout operations for the image signal. The additional image signal and the image signal may be generated based on a single integration time period.

If desired, the charge storage region may be a floating diffusion region. The control circuitry may be operable to control the image pixel to generate the reference signal by resetting the floating diffusion region to a reset voltage level and isolating the floating diffusion region for a time period, during which the reference signal is generated.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
an array of image pixels, wherein an image pixel in the array of image pixels includes a photosensitive element, a charge storage region, and a transfer transistor interposed between the photosensitive element and the charge storage region;
control circuitry coupled to the array of image pixels and operable to control the image pixel to generate an image signal in an overflow mode of operation and to control the image pixel to generate a reference signal at the charge storage region by isolating the charge storage region from the photosensitive element for a time period, during which the reference signal is generated; and
processing circuitry operable to correct for a dark signal noise in the image signal based on the reference signal.

2. The imaging system defined in claim 1, wherein the control circuitry is operable to control the image pixel to generate an additional image signal in the overflow mode of operation, and the image signal and the additional image signal are generated based on a single integration time period.

3. The imaging system defined in claim 2, wherein the control circuitry is operable to control readout circuitry to perform a readout operation for the additional image signal prior to a readout operation for the image signal.

4. The imaging system defined in claim 3, wherein the processing circuitry is operable to generate a high dynamic range image based on the additional image signal and the image signal.

5. The imaging system defined in claim 3, wherein the processing circuitry is operable to correct for the dark signal noise based on a comparison of the additional image signal with a threshold level.

6. The imaging system defined in claim 1, wherein the image signal is generated during an additional time period, and wherein the processing circuitry is operable to correct for the dark signal noise based on a ratio between a duration of the time period and a duration of the additional time period.

7. The imaging system defined in claim 6, wherein the processing circuitry is operable to correct for the dark signal noise by multiplying the reference signal by the ratio and subtracting the ratio-multiplied reference signal from the image signal.

8. The imaging system defined in claim 1, wherein the reference signal is generated before the image signal is generated, and the reference signal is stored at a frame buffer.

9. The imaging system defined in claim 1, wherein the reference signal is generated after the image signal is generated, the imaging system further comprising:
readout circuitry coupled to the array of image pixels and operable to perform a readout operation for the image signal and a readout operation for a reset level signal after the readout operation for the image signal.

10. The imaging system defined in claim 9, wherein the readout circuitry is operable to perform a readout operation for the reference signal, and the readout operations for the reset level signal and the reference signal form a correlated double sampling readout.

11. The imaging system defined in claim 10, wherein the readout circuitry is operable to perform readout operations for an additional reset level signal and an additional image signal before the readout operation for the image signal, and wherein the additional image signal and the image signal are generated based on a single integration time period.

12. The imaging system defined in claim 1, wherein the charge storage region comprises a floating diffusion region.

13. The imaging system defined in claim 12, wherein the control circuitry is operable to control the image pixel to generate the reference signal further by resetting the floating diffusion region to a reset voltage level before isolating the floating diffusion region for the time period.

14. A method of generating image signals using an image pixel, the method comprising:
with a transistor and a photosensitive element coupled to a first terminal of the transistor, generating first and second image signals in an overflow mode of operation based on a first integration time period;
at the photosensitive element, generating a third image signal in a linear mode of operation based on a second integration time period; and
at a floating diffusion region coupled to a second terminal of the transistor, generating a reference signal for correcting a dark current noise while generating the third image signal at the photosensitive element.

15. The method defined in claim 14, wherein the first image signal is an overflow image signal, the second image signal is a complete image signal, and the overflow image signal and the complete image signal are useable to construct a high dynamic range image.

16. The method defined in claim 15, further comprising:
modifying the complete image signal based on the reference signal to correct for a noise component in the complete image signal.

17. A method of generating an image signal using an image pixel, the method comprising:
resetting a charge storage region to a reference voltage at a first time;
after resetting the charge storage region, preventing charge from a photosensitive element from overflowing to the charge storage region;
at a second time, performing a readout operation on a reference signal generated at the charge storage region, wherein the reference signal is generated between the first time and the second time and is indicative of a pixel-specific dark signal noise; and
after performing the readout operation on the reference signal, generating the image signal in an overflow mode of operation.

18. The method defined in claim 17, further comprising:
subtracting a modified version of the reference signal from the image signal to compensate for the pixel-specific dark signal noise.

19. The method defined in claim 18, wherein performing the readout operation on the reference signal comprises storing the reference signal at a frame buffer.

* * * * *